United States Patent [19]
Kusiak

[11] 3,722,641
[45] Mar. 27, 1973

[54] NO-BACK ACTUATOR SYSTEM

[75] Inventor: Edward H. Kusiak, Longmeadow, Mass.

[73] Assignee: United Aircraft Corporation, East Hartford, Conn.

[22] Filed: Sept. 16, 1971

[21] Appl. No.: 181,128

[52] U.S. Cl. ................ 192/8 C, 60/53 C, 91/41, 91/380
[51] Int. Cl. .............................. F16d 67/04
[58] Field of Search ...... 60/53 C; 192/8 C; 74/665 H; 91/41, 380, 388; 92/2, 15, 136

[56] References Cited

UNITED STATES PATENTS

| | | | |
|---|---|---|---|
| 2,421,814 | 6/1947 | Starkey | 192/8 C |
| 3,166,952 | 1/1965 | Lang | 60/53 C UX |
| 3,631,951 | 1/1972 | Quenneville | 192/8 C |

*Primary Examiner*—Edgar W. Geoghegan
*Attorney*—Norman Friedland

[57] ABSTRACT

A bidirectional no-back such as a sprag clutch or no-back spring for locking the rotary member of a screw type actuator for restraining its movement in either direction is loaded out of engagement to permit movement of the actuator by a pair of hydraulic motors cooperating therewith such that when one drives the other is driven.

6 Claims, 7 Drawing Figures

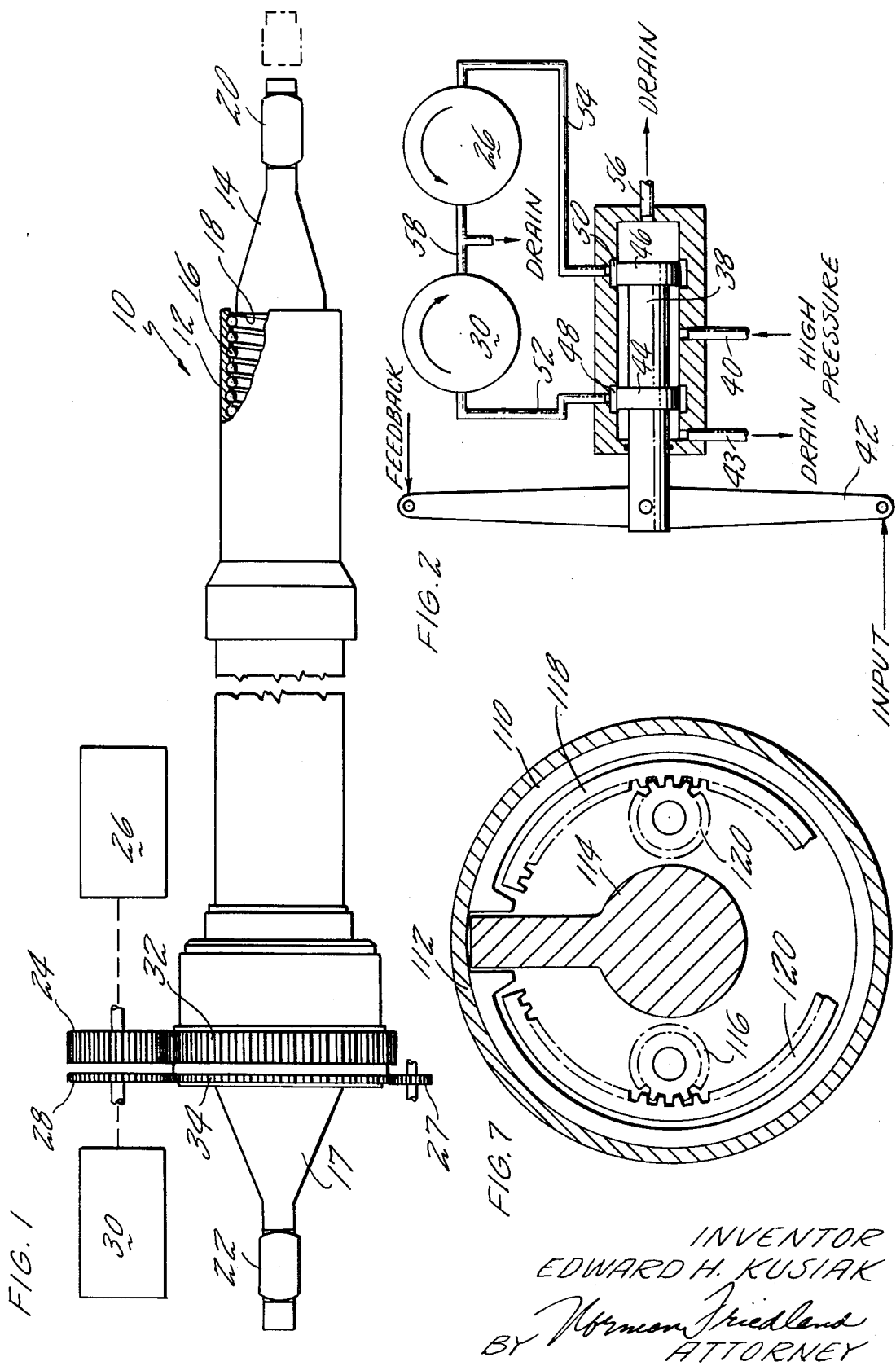

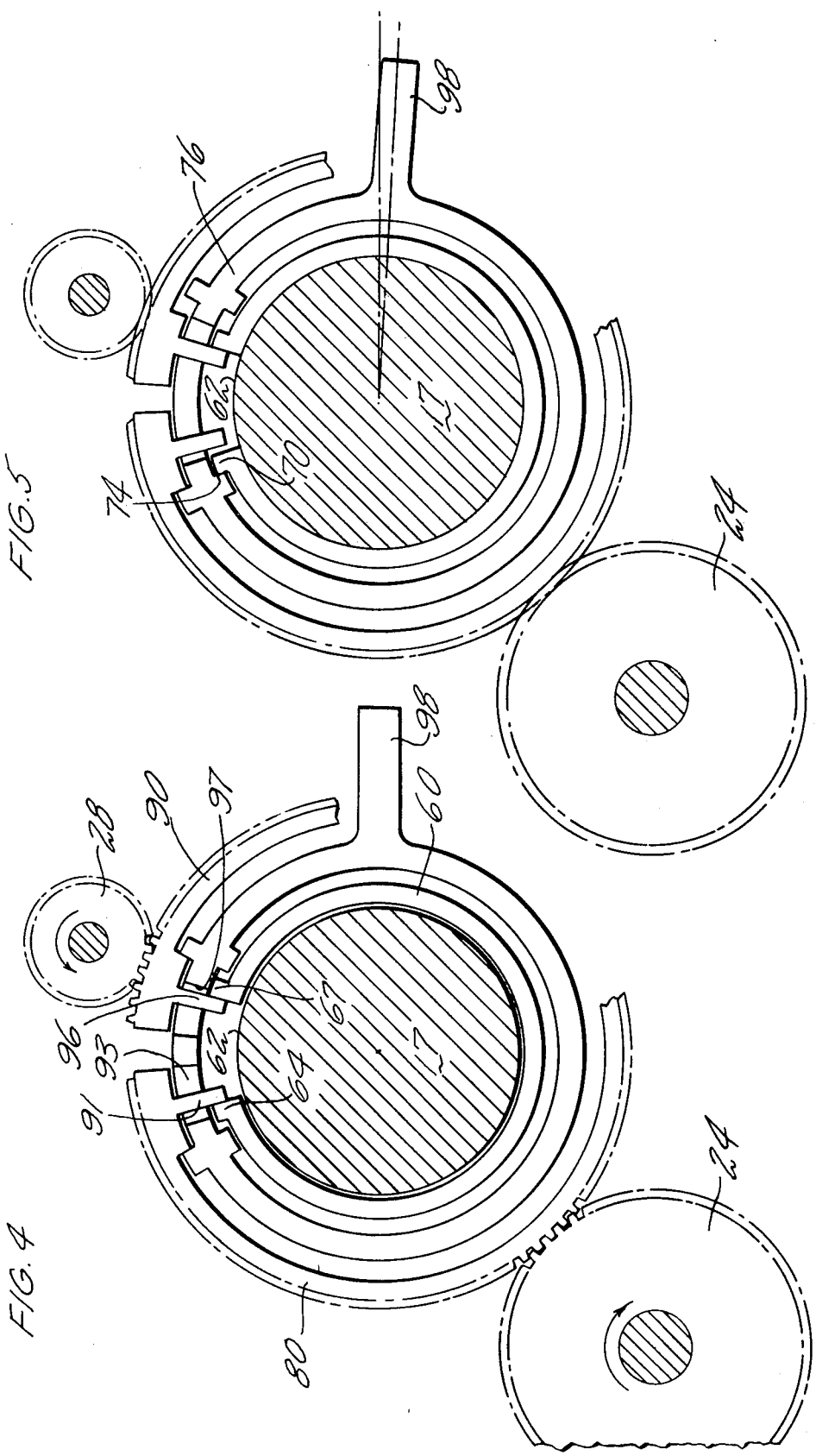

NO-BACK ACTUATOR SYSTEM

BACKGROUND OF THE INVENTION

This invention relates to a no-back actuating system and particularly to a bidirectional no-back system which employs a pair of hydraulically actuated motors in such a manner that when one drives the other is driven wherein both load the no-back spring out of engagement for positioning a load in two directions.

The no-back spring is a well-known device utilized as for a brake or clutch by cooperating with a shaft and a grounded member such that actuation or deactuation of the spring urges them into engagement in order to prevent the rotary member from rotating. One problem with the no-back spring in heretofore known types of systems is that the no-back spring frictionally engages the grounded member and drags when the load is moved in either direction. Usually when the load is moved in a direction where the actuator is aided by the load, rather than opposing the load, the friction is higher and chattering can be evidenced. This dragging causes heat and wear to the spring, which is undesirable and in some instances intolerable.

I have found that I can obviate the problems noted above by providing a pair of hydraulic motors which position the no-back spring in an out of engagement position relative to the mounted member when the load is positioned such that the hydraulic motor which is not driving the load serves as a pump in one direction; and the then acting pump when driving in its motor capacity the motor that just acts in its motor capacity acts as a pump in the other direction. Another advantage of this system is that each motor can be sized for the load that it must move or hold.

SUMMARY OF THE INVENTION

It is an object of this invention to provide for a bidirectional clutch or brake of an actuator means for disengaging the brake in both directions by the use of a pair of hydraulic motors for driving the actuator in each of its directions such that when one acts as a motor the other acts as a pump in one direction and vice versa in the other direction.

It is still a further object of this invention to provide for a ball-screw type actuator having a bidirectional no-back spring, a pair of hydraulic motors each of which are adapted to engage either end of the no-back spring where the motors act as a pump when in one mode of operation, and act as a motor in the other mode of operation.

A still further object of this invention is to provide a no-back control system having a no-back spring driven by a pair of hydraulic motors and including feedback means interconnecting the control through the no-back spring loading means.

Other features and advantages will be apparent from the specification and claims and from the accompanying drawings which illustrate an embodiment of the invention.

BRIEF DESCRIPTION OF THE DRAWINGS

FIG. 1 is a view partly in schematic, partly in elevation and partly in section illustrating a ball-screw actuator incorporating this invention.

FIG. 2 is a schematic view partly in section illustrating the operation of this invention.

FIG. 4 is a schematic illustration of this invention in one mode of operation.

FIG. 5 is a schematic view of this invention in another mode of operation.

FIG. 7 is a schematic of an alternate embodiment of this invention.

DESCRIPTION OF THE PREFERRED EMBODIMENT

Figure 3:
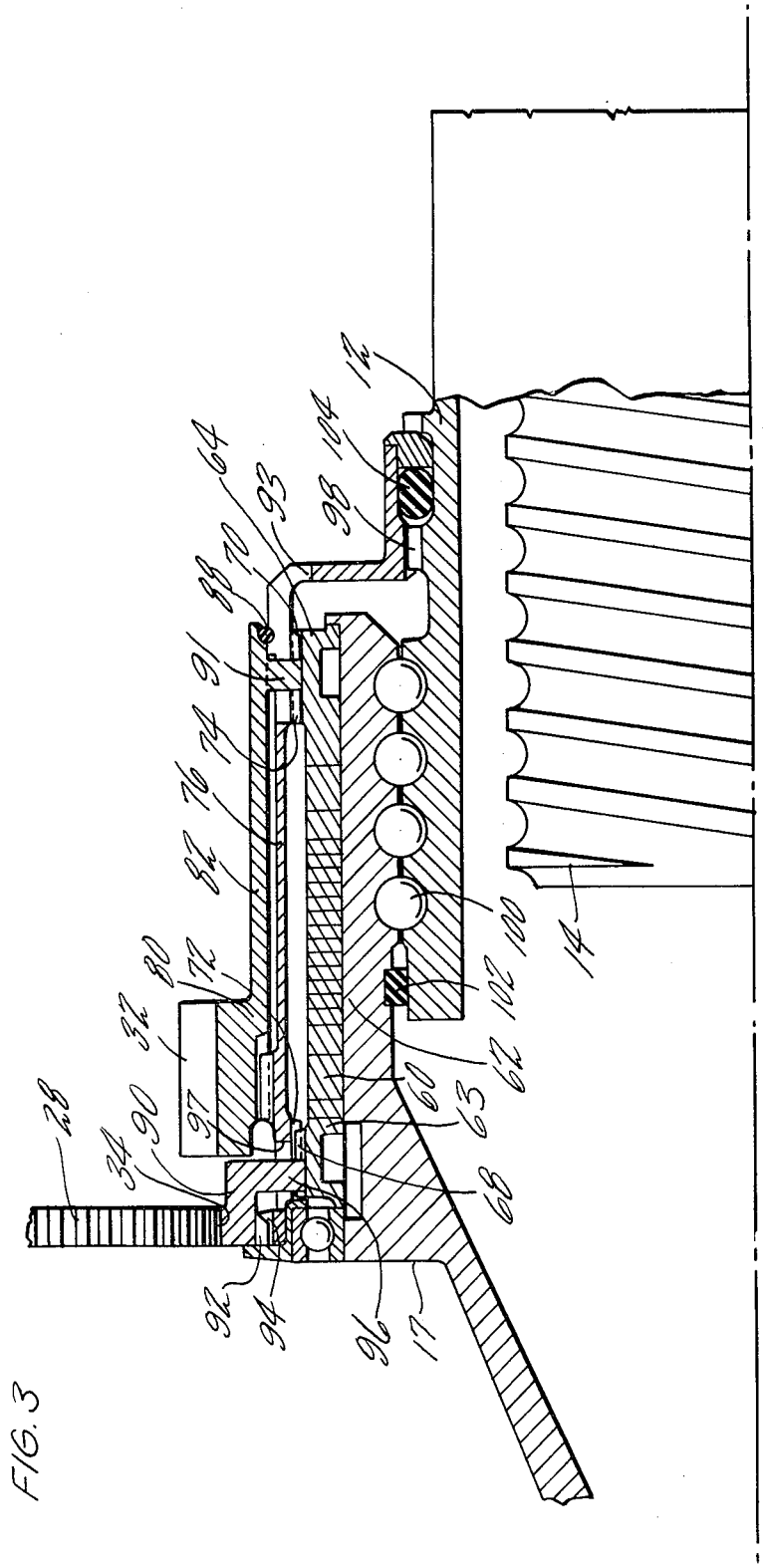
FIG. 3 is a fragmentary sectional view partly in elevation illustrating the details of this invention.

While the preferred embodiment to be described herein illustrates the brake as a bidirectional no-back spring any other bidirectional braking mechanism, so as a sprag clutch, is contemplated as being within the scope of the invention.

Reference is made to FIG. 1 which shows a typical ball-screw actuator generally illustrated by numeral 10 having an elongated nut 12 and telescoping screw 14. Rotation of the nut 12 serves to rotate the balls 16 in grooves 18 of screw 14 in order to translate screw 14 in and out of nut 12. Obviously, a load is supported on end 20 of screw 14 and the actuator is secured to a fixed member on end 22 of housing 17. In accordance with this invention and as will be explained hereinbelow, nut 12 is driven by gear 24 suitably driven by a hydraulic motor generally illustrated by numeral 26 and in alternate mode by gear 28 which is suitably driven by hydraulic motor 30. Gears 24 and 28 as can be seen from FIG. 1 mesh with the teeth 32 and 34, respectively, suitably mounted to drive the nut 12. Thus, rotation of gear 24 will cause the nut 12 to rotate and translate the screw 14 in one axial direction. In this mode of operation teeth 34 drive gear 28 connected to hydraulic motor 30 causing it to act as a pump. Rotating gear 28 by virtue of the hydraulic motor 30 serves to rotate the nut 12 by virtue of teeth 34 for positioning the screw in the opposite direction. In this mode of operation, teeth 32 drive gear 24 which in turn drives the hydraulic motor 26 which consequently acts as a pump. Obviously, the motor when in its pump capacity serve to load the no-back and dissipate any unwanted heat energy.

To more fully appreciate the operation of the invention, reference is next made to FIG. 2 which schematically illustrates the control mechanism for operating the hydraulic motors 30 and 26. Hydraulic high pressure, say 3,000 psi. is admitted to spool valve 38 via the central passage where it can be routed to either pump 30 or 26. Spool valve 38 is suitably connected to an input driven mechanism which may take the form of lever 42. Thus, moving lever 42 so as to position the lands 44 and 46, of spool valve 38 to uncover either ports 48 or 50 meters hydraulic fluid from pressurized fluid source from line 40 into motor 30 via line 52 or motor 26 via line 54, respectively. When motor 30 is connected to hydraulic high pressure from line 40 (when the spool valve 38 is moved to the left) port 50 is uncovered and placed in communication with drain line 56 for connecting the inlet of motor 26 to drain.

During this mode of operation the motor 26 which now acts as a pump is connected to drain pressure at its inlet and discharges that pressure into drain via line 54, port 50, and line 56 at a higher pressure loading the no-back spring in a manner to be described hereinafter. Obviously, in the other mode of operation, namely when motor 26 is driving the load, motor 30 then acts as a pump. In this mode of operation the input lever would translate the valve spool 38 to the right so that land 44 further uncovers port 48 to communicate line 52 at the inlet of motor 30 to line 43 which is at drain pressure. Thus high pressure admitted from line 40 into line 54 via port 50 serves to drive hydraulic pump 26 to rotate it counterclockwise. This causes the nut to rotate which, in turn, rotates teeth 34 which are in mesh with gear 28 for driving the motor 30, which in this mode of operation, acts as a pump. The pump is therefore loaded by the flow from drain line 58 which it pumps through line 52, port 48 and drain 43 for likewise loading the no-back spring out of engagement. It will be appreciated that both motors 26 and 30 are sized for the particular loads that each encounter so that they do not necessarily have to be the same size. The pressures supplied to each are likewise controlled to be commensurate with the size of the motors. Lands 44 and 48 are dimensioned relative to ports 48 and 50 so that when in the line-on-line position there will always be flow into motors 30 and 26 to assume that the motors preload the no-back spring. A feedback connection from the nut, as for example by virtue of gear 27 to lever 42 serves to hold the valve in the line-on-line position whenever the input is in the steady-state position. It is apparent from the foregoing that the flow of hydraulic supply pressure to either motor serves to drive the screw rectilinearly and that the feedback connected from the actuator serves to return the control valve to its balanced condition, there always being sufficient flow to the motors to maintain the no-back in the preloaded condition. Obviously, the velocity of the actuator screw would depend on the flow to the motor. It may be in certain applications desirable to control this velocity which may be occasioned by any suitable means such as limiting the rate of flow by use of flow limiters or orifices in the motor feed line or a dashpot connected to the input lever and the like.

The operation of the no-back spring can best be understood by referring to FIGS. 3, 4, 5, and 6. Reference is next made to FIG. 3 showing the details of the no-back spring and the actuating gears. No-back spring 60 is helically wound about the fixed drum 62 extending from housing 17 and carries on either end extension portions 63 and 64. The spring may be made from suitable material and preferably the rectangular cross sectional area of the coils are varied substantially as shown in order to absorb the loads in the most efficacious manner. The extended portions 63 and 64 carry splines 68 and 70, respectively, which are adapted to engage splines 72 and 74 formed on the elongated drive shaft 76. Teeth 32 are formed on gear 80 which is formed integral with shaft 82 and restrained in an axial position by the locking ring 88. Teeth 34 are formed on gear 90 which meshes with the teeth of gear 28. Spline 92 formed on the inner diameter of the housing gear 90 is adapted to engage spline 94 formed on the outer diameter of shaft 76. Finger 96 extending through slot 97 formed in the elongated shaft 76 is adapted to engage the spline 68 formed on the extension 63 of the no-back spring 60. A similar finger 91 integrally formed on the shaft 82 extends downwardly through slot 93 formed in drive shaft 76 and is likewise adapted to engage spline 74 of the no-back spring extension 64. Under normal operation the gears 90 and 80 preload the no-back spring 60 so that it is out of engagement of the drum surface of drum 62 permitting the nut 12 driven by the drive shaft 76 via spline 98 to rotate. It being noted that nut 12 is rotatably supported in housing 17 by ball bearings 100. "O" seals 102, and 104 may be incorporated in order to prevent lubrication oil from leaking.

Thus rotation of gear 80 when driven by motor 26 via gear 24 rotates the drive shaft 76 and consequently nut 12 in a direction to extend the screw 14 as was described in connection with FIG. 1. The rotation of drive shaft 76 drives gear 28 via splines 94 and 92 and gear 90 causing the hydraulic motor 30 to be driven in its pump acting capacity. The loading of the gears 80 and 90 preloads the no-back spring 60 to disengage it from the drum 62 by virtue of fingers 96 and 91 bearing against the splines 68 and 74, respectively.

Figure 6:
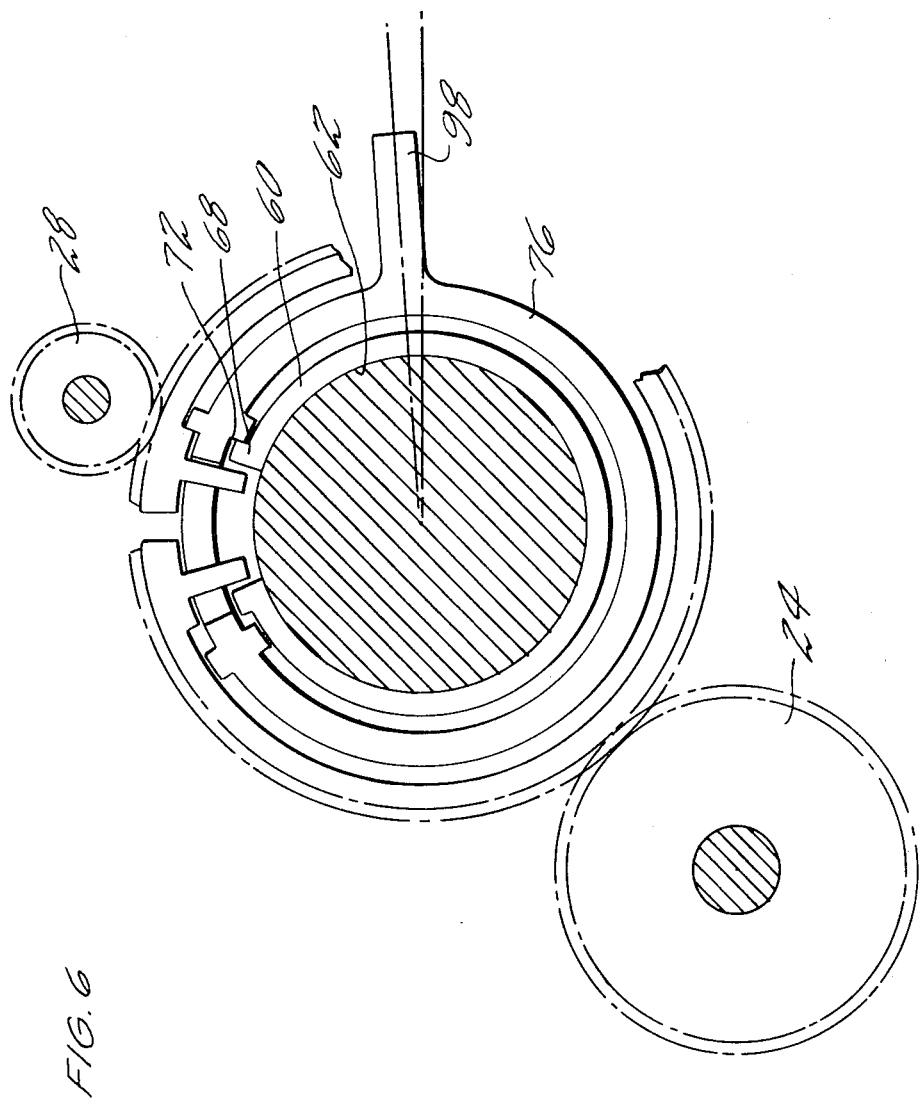
FIG. 6 is a schematic view of this invention in still another mode of operation.

The preloading operation of the no-back spring 60 can best be understood by referring to FIGS. 4, 5 and 6. Reference is now made to FIG. 4 which schematically shows the operation of the no-back spring and the hydraulic motors in their normal mode of operation. Gears 24 and 28 hydraulically driven by hydraulic motors 26 and 30, respectively, preload the no-back spring 60 so that it is out of engagement with drum 62. This is accomplished by virtue of rotating the gear 24 in a clockwise direction which in turn rotates the gear 80 in a counterclockwise direction so that depending finger 91 abuts against the end 64 of the no-back spring 60 for loading it out of contact with drum 62. It being noted that like reference numerals are used for like parts and this illustration schematically shows the splines and attendant hardware as shoulders so as to more clearly depict the operation of the no-back spring. Likewise the hydraulic motor 30 rotates gear 28 in a counterclockwise direction which rotates gear 90 in a clockwise direction so that the depending finger 96 bears against the end 67 of no-back spring 60 to also preload it away from drum 62. In this mode of operation it will be noted that the fingers 91 and 96 are spaced in slots 93, and 97, respectively, so as to be out of contact with drive shaft 76. Thus, under normal operation, when the hydraulic pressure is available rotating the nut in a counterclockwise or clockwise direction by virtue of driving it either by the drive gear 24 or 28 will rotate drive shaft 76 in either a clockwise or counterclockwise direction for driving the schematically illustrated spline 98 to extend or retract the telescoping screw 14.

FIGS. 5 and 6 are schematic representations of the positions of the no-back spring when in the activated or brake mode so as to lock the screw in position by braking the nut in the event that failure of hydraulics is evidenced. If, for example, hydraulics are lost when the load or the screw is loaded in the extended position, the force produced by the load as for example, an aircraft wing positioned by the no-back actuator, would cause a slight movement through the splines 98 such that splines 70 and 74 normally in spaced relation would engage as schematically illustrated by the shoulders in FIG. 5 bearing the same reference numerals as the splines in FIG. 3. This action would tend to wind the spring so that the end of spring 60 would bear up against the drum 62 and consequently prevent any movement relative to the fixed member 62 and the drive shaft 76.

Similarly, as is evident in FIG. 6 if a loss of hydraulic is evidenced when the screw is loaded in the detracted position the load of the wing would cause the drive shaft 76 to move in a counterclockwise direction such that the shoulders 68 and 72, corresponding to the splines having the same reference numerals in FIG. 3, which are normally out of engagement bear against each other for winding the no-back spring 60 so that it is urged against the drum 62 for locking the nut 76 and preventing any further movement of the screw 14.

FIG. 7 exemplifies another embodiment of the invention and as shown schematically it differs from the other disclosed embodiment by the drum being mounted on the outer rather than the inner periphery of the no-back spring. In this arrangement no-back spring 110 is in compression when holding a load and normally bears against the drum surface 112 to prevent the driving shaft generally illustrated by reference numeral 114 from rotating. Preloading the fluid motor driven gears 116 and 120, similarly as was described above, forces the gears 118 and 120, respectively, to compress the ends of no-back spring 110 to move the coils out of engagement with the drum 112.

It should be understood that the invention is not limited to the particular embodiments shown and described herein, but that various changes and modifications may be made without departing from the spirit or scope of this novel concept as defined by the following claims.

I claim:

1. A system for disengaging a bidirectional no-back brake or clutch as a sprag clutch or no-back spring for an actuator having a rotary nut and a nonrotary screw with means for rotating the nut to telescope the screw comprising a pair of combined hydraulic motor-pump units, means connecting said pair of combined motor-pump units for rotating said nut in a clockwise and counterclockwise direction, and control means for alternately actuating said pair of motor-pump units such that when one is the motor the other is a pump and means operatively connecting said pair of motor-pump units and said bidirectional brake or clutch to disengage the same so as to permit rotation of said nut.

2. A system as claimed in claim 1 including feedback means interconnecting said actuator and said control means for holding said actuator in a predetermined position.

3. A system as claimed in claim 2 including an input receiving member operatively connected to said control means to position said actuator a function of the input imposed on said input receiving member.

4. A system as claimed in claim 2 including a source of hydraulic pressure, said control means alternately interconnecting said source and said motor-pump combination units to alternately rotate said rotary nut in a clockwise and counterclockwise direction.

5. A system for braking a rotary member of an actuator including braking means for normally braking said rotary member so as to prevent its rotation, means driving said rotary member including a pair of motor-pump combined units that alternately drive said rotary member in either a clockwise or counterclockwise direction such that when one of said pair drives the other of said pair of motor pumps, and means interconnecting said pair of motor-pump combined units and said braking means to impose a continuous load on said braking means to render it in its nonbraking mode.

6. A system for braking a rotary member of an actuator including braking means for normally braking said rotary member so as to prevent its rotation, means driving said rotary member including a first motor-pump combined unit that drives said rotary member in one direction and a second motor-pump combined unit driving said rotary member in an opposite direction such that when said first motor-pump combined unit drives the second motor-pump unit pumps, means interconnecting said first and second motor-pump combined units and said braking means to impose a continuous load on said braking means to render it in its nonbraking mode, and means for admitting hydraulic fluid to said first and second motor-pump combined units to keep both in a hydraulically loaded condition, whereby a loss of hydraulic fluid causes an unloaded condition so that the brakes automatically engage.

* * * * *